US008291058B2

(12) United States Patent
Head et al.

(10) Patent No.: US 8,291,058 B2
(45) Date of Patent: Oct. 16, 2012

(54) HIGH SPEED NETWORK DATA EXTRACTOR

(75) Inventors: Tommy Joe Head, Richardson, TX (US); Daris A. Nevil, Fairview, TX (US)

(73) Assignee: Intrusion, Inc., Richardson, TX (US)

( * ) Notice: Subject to any disclaimer, the term of this patent is extended or adjusted under 35 U.S.C. 154(b) by 484 days.

(21) Appl. No.: 12/709,383

(22) Filed: Feb. 19, 2010

(65) Prior Publication Data

US 2011/0206064 A1 Aug. 25, 2011

(51) Int. Cl.
*G06F 15/173* (2006.01)

(52) U.S. Cl. ........ 709/223; 709/202; 709/203; 709/232; 709/237; 707/776

(58) Field of Classification Search .................. 709/202, 709/203, 224, 232, 237; 707/776
See application file for complete search history.

(56) References Cited

U.S. PATENT DOCUMENTS

| | | | |
|---|---|---|---|
| 6,034,963 A | 3/2000 | Minami et al. | |
| 6,611,524 B2 | 8/2003 | Devanagondi et al. | |
| 6,651,099 B1 * | 11/2003 | Dietz et al. | 709/224 |
| 6,661,431 B1 * | 12/2003 | Stuart et al. | 715/733 |
| 6,678,746 B1 | 1/2004 | Russell et al. | |
| 6,909,713 B2 | 6/2005 | Magnussen et al. | |
| 7,017,186 B2 | 3/2006 | Day | |
| 7,085,271 B2 | 8/2006 | Gooch | |
| 7,120,790 B1 * | 10/2006 | LoPresti | 713/151 |
| 7,177,930 B1 | 2/2007 | LoPresti | |
| 7,181,748 B2 | 2/2007 | Macdonald et al. | |
| 7,187,694 B1 | 3/2007 | Liao | |
| 7,206,861 B1 | 4/2007 | Callon | |
| 7,248,586 B1 | 7/2007 | Hughes, Jr. et al. | |
| 7,266,131 B2 | 9/2007 | Mitchell | |
| 7,287,092 B2 | 10/2007 | Sharp | |
| 7,292,586 B2 | 11/2007 | Dewan et al. | |
| 7,292,591 B2 | 11/2007 | Parker et al. | |
| 7,308,715 B2 | 12/2007 | Gupta et al. | |
| 7,319,847 B2 * | 1/2008 | Xanthos et al. | 455/67.11 |
| 7,433,304 B1 | 10/2008 | Galloway et al. | |
| 7,436,853 B2 | 10/2008 | Basso et al. | |
| 7,492,720 B2 | 2/2009 | Pruthi et al. | |
| 7,492,771 B2 | 2/2009 | Basso et al. | |
| 7,543,054 B1 | 6/2009 | Bansod et al. | |
| 7,580,408 B2 | 8/2009 | Kendall | |
| 7,606,263 B1 | 10/2009 | Parker | |

(Continued)

OTHER PUBLICATIONS

Ulrich Drepper, "What Every Programmer Should Know About Memory", Nov. 21, 2007.

(Continued)

*Primary Examiner* — Michael Won
(74) *Attorney, Agent, or Firm* — Alvin R. Wirthlin

(57) ABSTRACT

The present invention describes a system and method of extracting and storing data elements from network packets, thus performing the task of data mining. In one embodiment of the present invention incoming packets are decomposed one protocol layer at a time to extract data elements contained in the protocol headers. Layer-specific parsers perform deep packet inspection in order to extract data elements from upper-level protocols. Extracted data is arranged in rows, which are subsequently stored into a memory-based accumulator. After some length of time the accumulator is flushed to disk files. Another process reads the flushed disk files row-by-row, inserting each row into a relational database. Standard SQL operations are performed on the relational database in order to generate and display reports of the collected data.

41 Claims, 8 Drawing Sheets

U.S. PATENT DOCUMENTS

| | | | |
|---|---|---|---|
| 7,616,662 B2 | 11/2009 | Mishra et al. | |
| 7,636,787 B2 | 12/2009 | Zhao et al. | |
| 8,200,203 B1 * | 6/2012 | Christensen et al. | 455/414.1 |
| 2001/0053150 A1 | 12/2001 | Clear et al. | |
| 2003/0014662 A1 | 1/2003 | Gupta et al. | |
| 2003/0074106 A1 * | 4/2003 | Butler | 700/236 |
| 2004/0139071 A1 | 7/2004 | Lee et al. | |
| 2007/0248012 A1 * | 10/2007 | Glinsman et al. | 370/232 |
| 2007/0288615 A1 | 12/2007 | Keohane et al. | |
| 2008/0019368 A1 | 1/2008 | Liu et al. | |
| 2009/0177765 A1 | 7/2009 | Stute et al. | |
| 2009/0232016 A1 | 9/2009 | Pruthi et al. | |
| 2009/0316584 A1 | 12/2009 | Tanaka et al. | |
| 2009/0319775 A1 | 12/2009 | Buer et al. | |

OTHER PUBLICATIONS

W. Eatherton, Z. Dittia, G. Varghese, "Tree Bitmap: Hardware/Software IP Lookups with Incremental Updates", Printed Feb. 19, 2010.

"Deep Packet Inspection", Wikipedia, http://en.wikipedia.org/wiki/Deep_packet_inspection, Printed Feb. 19, 2010.

"Stateful Firewall", Wikipedia, http://en.wikipedia.org/wiki/Stateful_Packet_Inspection, Printed Feb. 19, 2010.

"Data Mining", Wikipedia, http://en.wikipedia.org/wiki/Data_mining, Printed Feb. 19, 2010.

Harry Direen, "NeoSlider Packet Search Engine with Optional Pre-Parser and Optional Proximity Search Engine", 2007, Xpriori, LLC, Colorado Springs, CO, http://www.xpriori.com/resources/science_of_xpriori/wp_neoSlider-packet-v1.1.pdf.

Maged Attia, Ingrid Verbauwhede, "Programmable Gigabit Ethernet Packet Processor Design Methodology", European Conference on Circuit Theory and Design, Aug. 2001, Espoo, Finland, http://www.cosic.esat.kuleuven.be/publications/article-656.pdf.

Sourcefire Vulnerability Research Team, "Sourcefire VRT Methodology", http://assets.sourcefire.com/snort/vrtwhitepapers/SF_VRT_Methodology.pdf (2006).

Peter Pin-Shan Chen, "The Entity-Relationship Model—Toward a Unified View of Data", Massachusetts Institute of Technology, ACM Transactions on Database Systems, vol. 1, No. 1, Mar. 1976.

"Entity-Relationship Model", Wikipedia, http://en.wikipedia.org/wiki/Entity-relationship_model, Printed Feb. 19, 2010.

"Ethernet", Wikipedia, http://en.wikipedia.org/wiki/Ethernet, Printed Feb. 19, 2010.

"IPv4", Wikipedia, http://en.wikipedia.org/wiki/IPv4, Printed Feb. 19, 2010.

"Transmission Control Protocol", Wikipedia, http://en.wikipedia.org/wiki/Transmission_Control_Protocol, Printed Feb. 19, 2010.

"SMTP", Wikipedia, http://en.wikipedia.org/wiki/SMTP, Printed Feb. 19, 2010.

"Cache", Wikipedia, http://en.wikipedia.org/wiki/Cache, Printed Feb. 19, 2010.

"Cache Algorithms", Wikipedia, http://en.wikipedia.org/wiki/Cache_algorithms, Printed Feb. 19, 2010.

"Database Caching", Wikipedia, http://en.wikipedia.org/wiki/Database_cache, Printed Feb. 19, 2010.

Kaus Elhardt, Rudolf Bayer, "A Database Cache for High Performance and Fast Restart in Database Systems", ACM Transactions on Database Systems, vol. 9, No. 4, pp. 503-525, 1984.

Mehmet Altinet, Christof Bornhovd, Sailesh Krishnamurthy, C. Mohan, Hamid Pirahesh, Berthold Reinwald, "Cache Tables: Paving the Way for an Adaptive Database Cache", San Jose, CA, Proceedings of the 29th VLDB Conference, Berlin, Germany, 2003.

"Network Tap", Wikipedia, http://en.wikipedia.org/wiki/Network_tap, Printed Feb. 19, 2010.

Dmitrii Zagorodnov, Keith Marzullo, "Managing self-inflicted nondeterminism", Univeristy of Tromso, University of California, San Diego, http://www.cs.uit.no/~dmitrii/research/pubs/zagorodnov_marzullo-managing_self_inflicted_nd-hotdep05.pdf (no date).

* cited by examiner

HIGH SPEED NETWORK DATA EXTRACTOR

BACKGROUND OF THE INVENTION

1. Field of the Invention

The present invention is related to computer networks and, more particularly, to mining data from network packets.

2. Description of the Prior Art

Current network data mining systems are under increasing pressure to handle higher and higher data throughputs of, e.g., 20 gigabits per second or more, while requiring extraction of data deep within the highest layers of the packet stream. The ever increasing number of protocols and their increased complexity limit the use of hardware data miners. The speed limitations of single-threaded software data miners restricts the maximum data throughput to well under 1 gigabits per second. Hence there is a need to increase the data throughput of software data miners to 20 gigabits per second and beyond.

One tool for analyzing and decoding network traffic is an open-source application known as Wireshark™, which is representative of a range of open-source and commercial products. However, such applications suffer from two major problems. The first problem is that they cannot decode packets at full wire speeds on a continuous basis. The second problem is that they do not have a mechanism for extraction of data from continuous packet streams at full wire speeds.

Prior art patented technology, such as U.S. Pat. No. 7,120,790, addresses the problem of processing packets from high speed networks in two ways. A first method is to reduce the number of packets inspected by applying filters to each packet. A second method is to classify, or summarize, each packet into a much simpler form by limiting the data fields inspected in each packet. The disadvantage to this approach is that analysis is based only on statistical models and not on actual data.

The present invention described herein is capable of decoding and parsing packets at full wire speeds up to 20 gigabits per second while simultaneously extracting targeted data from the packets. The extracted data is made available to the user in a relational database.

SUMMARY OF THE INVENTION

In accordance with one aspect of the invention, a system for network data extraction includes a packet decoding engine with at least one protocol decoder operable to decompose and parse received packets and identify extractable data entities from the received packets. A data extraction engine is operable to extract identified data entities from the packets and arrange the data elements into entity sets along with statistical elements reflective of redundant entity sets. An accumulator is provided for storage of extracted entity sets and elimination of redundant entity sets.

In accordance with a further aspect of the invention, a method for network data extraction includes receiving packets of data, each packet having at least one protocol layer and at least one payload section; decomposing the received packets to delineate a location of the at least one protocol layer within each packet; parsing the received packets to access data entities in the at least one payload section within the packet; extracting data entities from the at least one protocol layer and payload section within the packet; constructing entity sets from the extracted data entities; inserting at least some of the entity sets into an accumulator; and inserting at least some of the entity sets from the accumulator into a relational database.

In accordance with yet a further aspect of the invention, a system for network data extraction includes at least one processor operable to execute computer program instructions; at least one memory operable to store computer program instructions executable by the processor; and computer program instructions stored in the at least one memory. The computer program instructions are executable to perform the steps of: receiving packets of data, each packet having at least one protocol layer and at least one payload section; decomposing the received packets to delineate a location of the at least one protocol layer within each packet; parsing the received packets to access data entities in the at least one payload section within the packet; extracting data entities from the at least one protocol layer and payload section within the packet; constructing entity sets from the extracted data entities; inserting at least some of the entity sets into an accumulator; and inserting at least some of the entity sets from the accumulator into a relational database.

In accordance with still another aspect of the invention, a computer program product for network data extraction includes a computer readable medium and computer program instructions, recorded on the computer readable medium. The program instructions are executable by a processor for performing the steps of: receiving packets of data, each packet having at least one protocol layer and at least one payload section; decomposing the received packets to delineate a location of the at least one protocol layer within each packet; parsing the received packets to access data entities in the at least one payload section within the packet; extracting data entities from the at least one protocol layer and payload section within the packet; constructing entity sets from the extracted data entities; inserting at least some of the entity sets into an accumulator; and inserting at least some of the entity sets from the accumulator into a relational database.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein.

It is noted that the drawings are intended to depict exemplary embodiments of the invention and therefore should not be considered as limiting the scope thereof. The invention will now be described in greater detail with reference to the accompanying drawings.

DETAILED DESCRIPTION OF THE INVENTION

Figure 1:
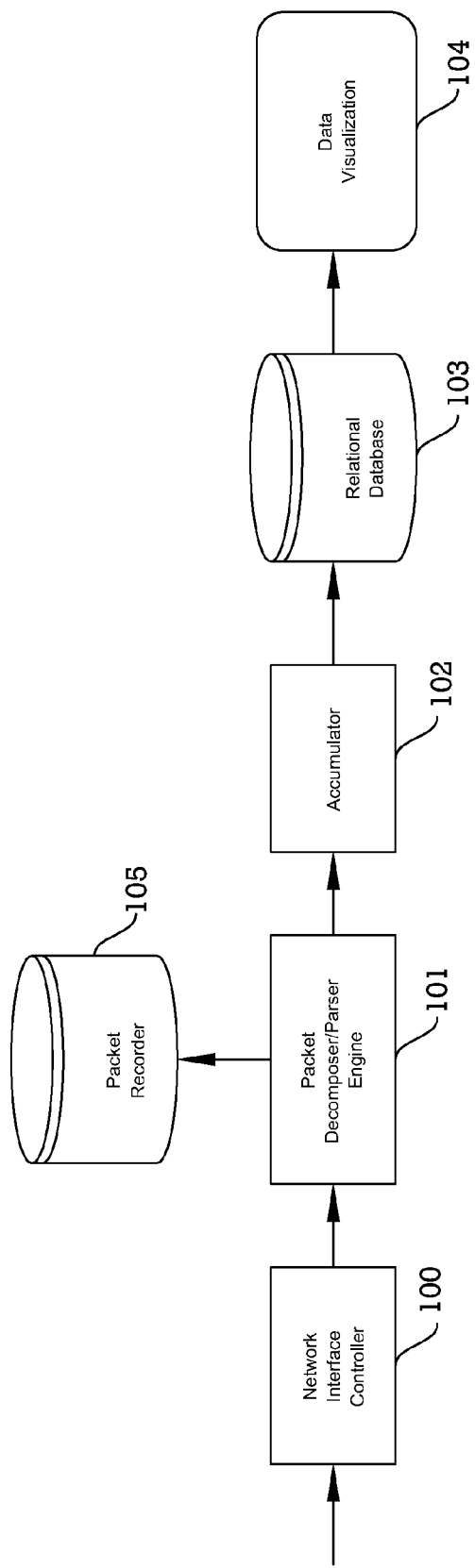
FIG. 1 is a simplified block diagram of a high speed network data extractor, in accordance with one embodiment of the present invention.

Referring to the drawings, and to FIG. 1 in particular, a high speed network data extractor 110 is illustrated. The high speed network data extractor preferably includes a network interface controller 100 operably connected to a packet decomposer/parser engine 101, an accumulator 102, a relational database 103, and a data display device 104. A packet recorder 105 can be connected to the packet decomposer/parser engine 101.

In one preferred embodiment of the present invention, the components of FIG. 1 all reside and operate on a single computer system. The computer system can include one or more CPU's, random-access memory, one or more network interface controllers 100, and one or more storage devices such as disk storage, flash drives, memory cards, as well as other volatile and/or non-volatile solid state memory devices.

In another preferred embodiment of the present invention the components of FIG. 1 reside and operate on multiple computer systems. For example, the network interface controller 100, packet decomposer/parser engine 101, packet recorder 105 and accumulator 102 reside and operate on a first computer system, while the relational database 103 resides and operates on a second computer system and the data display device 104 resides and operates on a third computer system.

In accordance with one embodiment of the present invention, the packet recorder 105 can be omitted. The packet recorder 105 is a well-known component. Accordingly, detailed operation of the packet recorder will not be further described.

The network interface controller 100 receives packets from the target network that will supply packets from which data will be extracted. Packets are routed into the network interface controller using one of a plurality of methods as is common in the present art. One methods utilizes a port-mirroring switch to aggregate all packets in the target network into a single transmission line into the network interface controller 100. Another method utilizes a network tap placed in-line with the main trunk of the target network. The network tap replicates the packets flowing in both directions and forwards them to the network interface controller 100. Yet another method is used for optical networks transmitted over fiber optic cables. In this case an optical splitter is utilized to duplicate the data stream and route the duplicate packets to the network interface controller 100.

The network interface controller 100 is configured to operate in promiscuous mode. Promiscuous mode allows the network interface controller to accept all packets regardless of their destination hardware address.

Each packet received by the network interface controller 100 is placed into a buffer in random access memory. In one embodiment of the present invention, the buffers are of a fixed size large enough to hold the largest packet expected to be received. In another embodiment of the present invention, the buffers are of a fixed size but much smaller than the maximum packet size. The packets are segmented into components small enough to fit into the buffers.

The buffers containing the received packet data are forwarded to the packet decomposer/parser engine 101. The packet data is analyzed by the protocol decoders and the desired data is extracted from the packet into zero or more entity sets. In one embodiment of the present invention, the packet data is forwarded to the packet recorder 105.

The entity sets generated by the packet decomposer/parser engine 101 are forwarded to the accumulator 102 for temporary storage. The entity sets are stored in the accumulator until some stimulus triggers an accumulator flush. In one embodiment of the present invention, the stimulus preferably comprises the age of the data in the accumulator and the amount of free space remaining in the accumulator.

An identical entity set may be created by the packet decomposer parser engine 101 a plurality of times. Upon receiving a duplicate entity set the accumulator 102 finds the duplicate row and updates the statistical data elements associated with the row. One such statistical data element is a count of the duplicate rows seen by the accumulator.

At some point the accumulator 102 receives a stimulus causing it to flush its contents to long-term storage. In one embodiment of the present invention the accumulator 102 flushes its contents to a flat file stored on a hard disk or other memory device, where another process reads the file and inserts the rows of data into a table in the relational database 103. In another embodiment of the present invention the accumulator 102 flushes its contents to a flat file stored on a hard disk or other memory device, and another process transmits the file to a second computer system where the rows of data are inserted into a table in the relational database 103.

After the extracted data is organized into entity sets and stored as rows into a table in the relational database 103, the user issues SQL commands to the database to retrieve and view the data. Additional programs and command are executed to derive relationships between the data elements in the tables of the relational database. Supplementary data contained in other tables in the relational database can be combined with the extracted data.

Packet Flow

This section provides a more detailed description of the operations performed on each packet as it moves through the system.

Figure 2:
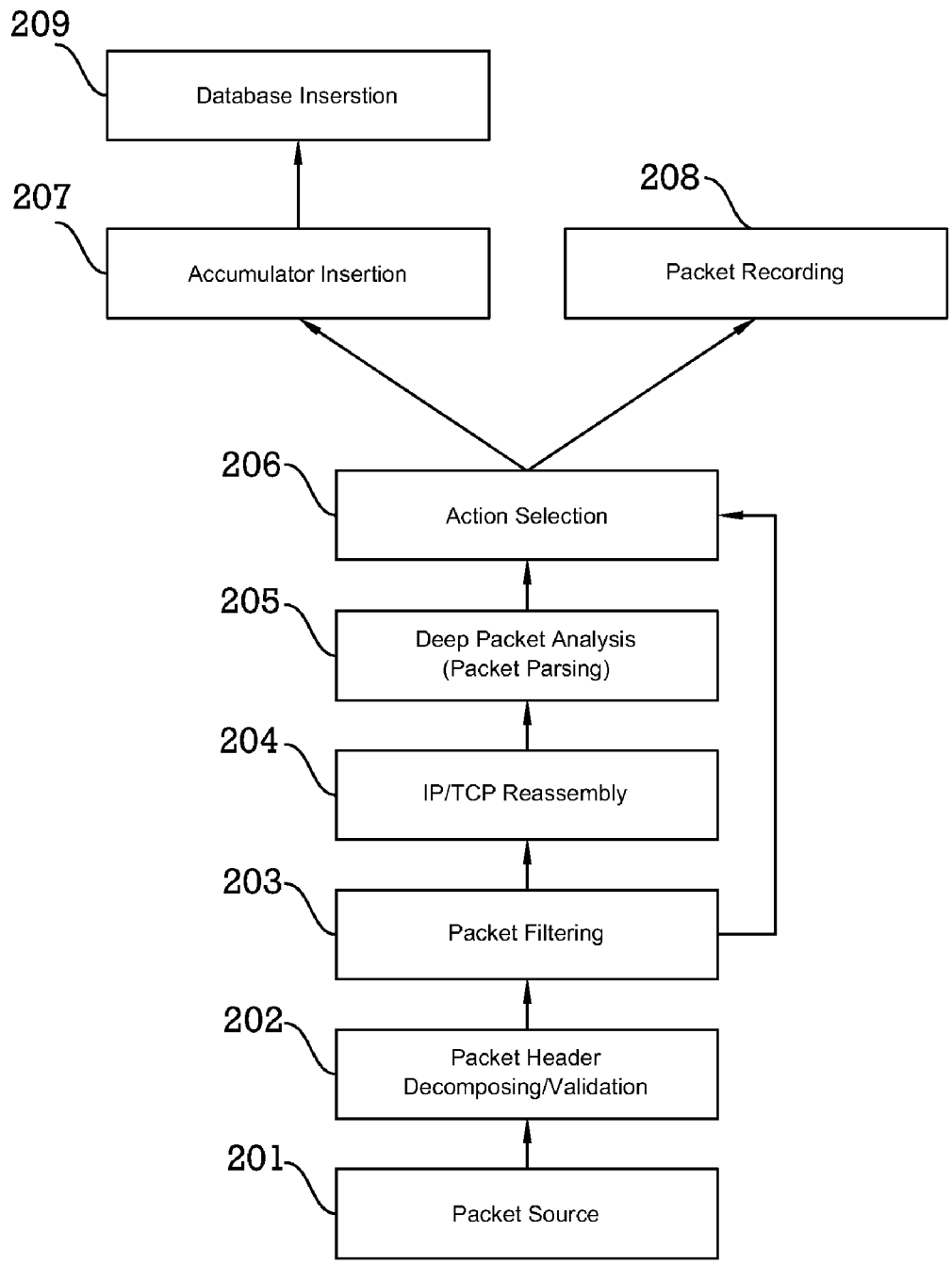
FIG. 2 is a flowchart illustrating the steps performed by the high speed network data extractor of FIG. 1.

Referring now to FIG. 2, packets enter the system at the packet source 201, which is equivalent to the network interface controller 100 of FIG. 1.

The packet header decomposing/validation process 202 detects each protocol layer in the packet. The identified layers are saved in a packet stack (described below) for later use by the deep packet analysis packet parser 205. Validation is performed on each packet header to prevent corruption of the CPU stack and memory storage. Detection of one or more invalid protocol headers or payloads will cause the process to abort decomposition of the packet. The packet is also dropped when a protocol layer's checksum is invalid. In both these cases the packet is discarded. In one embodiment of the present invention a statistical counter is incremented for each packet that is discarded due to invalid header information.

The packet advances from the packet header decomposing/validation process 202 to the packet filtering process 203 (refer to FIG. 4A, steps 408, 409 and 410, as will be described in greater detail below). The packet stack contains the information necessary to filter the packet based on comparisons to the packet's Ethernet addresses, IP addresses, TCP/UDP port numbers, and other fields available in protocol headers. Packets meeting all of the comparison criteria are permitted to proceed to the next process.

The IP/TCP reassembly process 204 occurs only for packets that are part of a segmented IP stream and/or part of a segmented TCP stream of packets. These packets must be reassembled into the correct sequence in order for the deep packet inspection packet parsing process 205 to successfully parse the packet stream. The IP packets are reassembled according to their identification and fragment offset fields. The TCP packets are reassembled according to their sequence numbers. This process is well understood by those of ordinary skill in the art.

The deep packet analysis packet parsing process 205 invokes parsing functions on upper-layer protocols, including FTP, SMTP, IMF, HTTP, SMB, and many others (refer to FIG. 4B, step 451, as will be described in greater detail below). This class of protocols typically utilize a rich language of variable length text and/or binary phrases. The best approach to decomposing such languages is through the use of state machines. One embodiment of the current invention uses regular expressions to extract the data element entities from the protocol data stream. The preferred embodiment of the current invention contains parser-scanners written in the high-level language Ragel. The Ragel code is compiled into C++ and then into binary executable code and linked into the protocol decoder for the target protocol layer. However, it will be understood that the parser scanners can be written in other high-level languages currently available or yet to be developed.

The deep packet analysis packet parsing process 205 is also responsible for collecting data element entities and arranging them into entity sets. The data elements are extracted from the packets, packet stack and state storage, as described later in the section entitled "Collecting Data into Entity Sets" and with reference to FIG. 4B, steps 453, 454 and 452.

The action selection process 206 determines which action to perform on the packet and the constructed entity sets (refer to FIG. 4A, step 455 as will be further described below). Actions include, but are not limited to, 1) write the entity set into the accumulator, 2) write the packet to disk or other memory device, 3) drop the packet, and 4) notify the user. The actions to be performed on a packet are selected from a plurality of predefined actions by the user when defining the entity sets and packet filter criteria. Depending on the actions selected, the packet is forwarded to the accumulator insertion process 207, the database insertion process 209, and/or the packet recording process 208.

Packet Decomposition and Parsing

Figure 3:
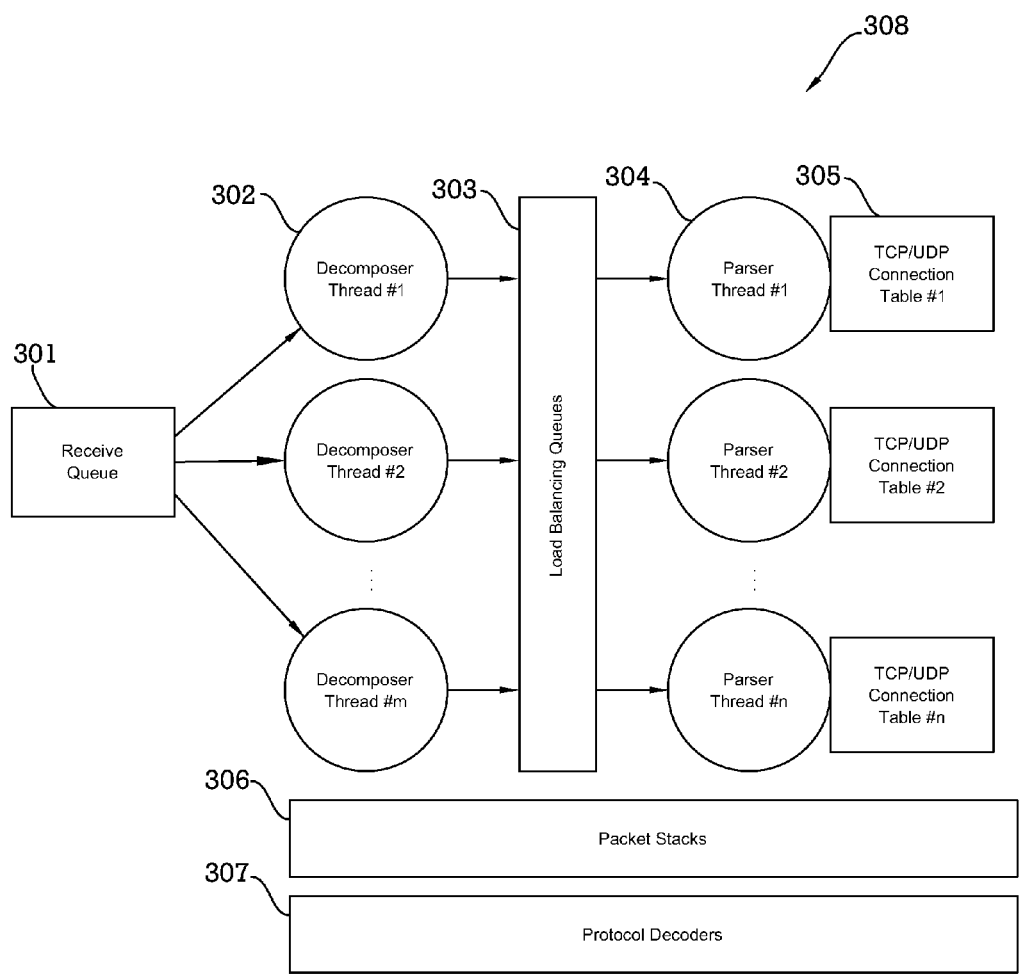
FIG. 3 is a simplified block diagram of a Packet Decomposer/Parser Engine of FIG. 1, in accordance with one embodiment of the present invention.

Referring now to FIG. 3, packet processing throughput is increased by executing a process 308 that subdivides the analysis of each packet into two processes, namely decomposition and parsing.

Decomposition involves receiving data from the receive queue 301 and identifying the start of each protocol layer in the stack and preferably applying a C/C++ data structure to fixed-sized headers. This process also includes validation of header checksums, when available, and validating header and payload lengths. This process is identified in FIG. 3 by the decomposer thread circles 302 labeled decomposer thread #1, #2, . . . #m. In accordance with a preferred embodiment of the present invention, each decomposer thread circle 302 represents an independent thread that executes on its own CPU or CPU core.

Parsing involves identifying data element entities within complex variable length protocols. This process includes construction of entity sets from various data element entities detected by decomposition and parsing. IPv4, TCP and UDP packets require the step of reassembly of packets into the correct order. This process is identified in FIG. 3 by the parser thread circles 304 labeled parser thread #1, #2, . . . #n. In the preferred embodiment of the present invention, each parser thread circle 304 represents an independent thread that executes on its own CPU or CPU core.

The number of decomposer threads 302 and the number of parser threads 304 can be independently adjusted to achieve the best possible performance. This is made possible by the load balancing queues process 303. One preferred embodiment of the present invention uses a round-robin algorithm to evenly distribute packets across the set of parser threads 304. In the case of TCP and UDP packets, the preferred embodiment generates a hash value from the packet's address data, which includes the source and destination IP address, the VLAN ID, and the source and destination TCP/UDP port numbers. The lower N number of bits indicate which parser thread 304 the packet is assigned to. This assures that all packets in a given TCP/UDP stream are forwarded to the same parser thread 304. This is important, as the preferred embodiment of the present invention associates a TCP/UDP connection table 305 with each parser thread 304. This arrangement eliminates the need for semaphores or mutexes in the TCP/UDP connection table 305, since only a single thread will access the data structures in that table.

The packet stacks block 306 represents a pool of packet stacks. Each packet is assigned a packet stack by the receive queue process 301 (refer to FIG. 4A, steps 404, 403 and 405, as will be further described below). The packet stack 306 data structure stores the offsets into the header and payload areas of each protocol in the packet (refer to FIG. 5, items 502, 503, 504, 505 and 506). This data is generated as a result of the decomposer thread process 302. The preferred embodiment of the present invention pre-allocates a pool of fixed-sized packet stacks 306 during the initialization phase of the program. This reduces the overhead required in selecting and assigning a packet stack to a packet.

The preferred embodiment of the present invention places packet content into fixed-sized buffers before sending the buffers to the receive queue 301. In many cases the packet content is much smaller than the containing buffer. In such cases a packet stack is placed in the unused buffer space immediately following the packet content. This eliminates the need to fetch a packet stack 306 from the pre-allocated pool.

The protocol decoders block 307 represents a plurality of functions, each of which specializes in decomposing and parsing a single protocol layer. The decomposer threads 302 and parser threads 305 invoke functions within the various protocol decoders for each protocol layer contained in the packet being processed (refer to FIG. 4A, step 407, as will be further described below).

Packet Decomposition Detail

Figure 4A:
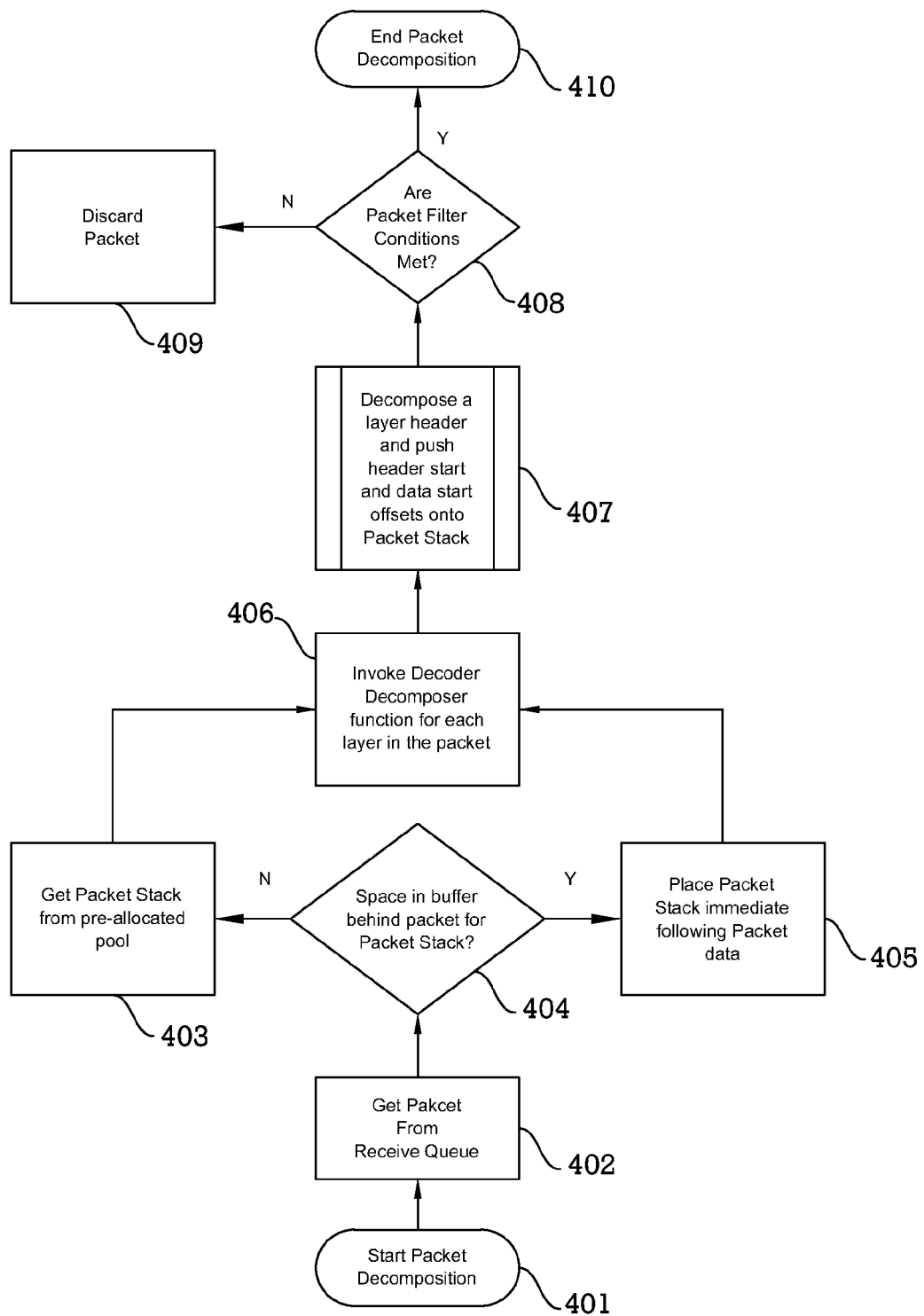
FIG. 4A is a flowchart depicting a method of decomposing network layer headers in a network packet, utilizing a packet stack, in accordance with one embodiment of the present invention.

Referring now to FIG. 4A, a flowchart 412 describes the detailed process of decomposing the protocol headers of a packet. Execution of the process begins at step 401 by calling the decompose method. During step 402 a packet is fetched from the receive queue, which holds zero or more packets that have previously been received from the monitored network. It is preferred to establish a Packet Stack for the packet. The Packet Stack will contain the list of network layers and their location in the packet. Step 404 tests if the Packet Stack can be placed in the Packet Buffer following the packet data. If the packet data is small enough then step 405 will place the Packet Stack in the Packet Buffer. Otherwise step 403 will allocate a Packet Stack from a pool of preallocated Packet Stacks.

Step 406 iterates over the protocol layers of the packet. Starting with with first protocol layer in the packet, each protocol layer's header is decomposed, and in step 407 the location of the protocol header is pushed onto the Packet Stack. Step 407 is shown as a sub-function, because each protocol layer must be decomposed by calling the decompose sub-function of the appropriate protocol decoder.

When all protocol layers have been decomposed the process can test if all the packet filter conditions have been met in step 408. The packet filter process utilizes the information pushed onto the Packet Stack to compare each filter against a particular protocol layer in the stack. As previously mentioned, the packet filter conditions are selected by the user.

If one or more packet filter conditions fails to match the packet data then the packet is discarded in step 409. This means that no further processing will be performed on the packet.

If all packet filter conditions match the packet data then the process exits at step 410. The system will proceed to the packet parsing process of FIG. 4B

Packet Parsing Detail

Figure 4B:
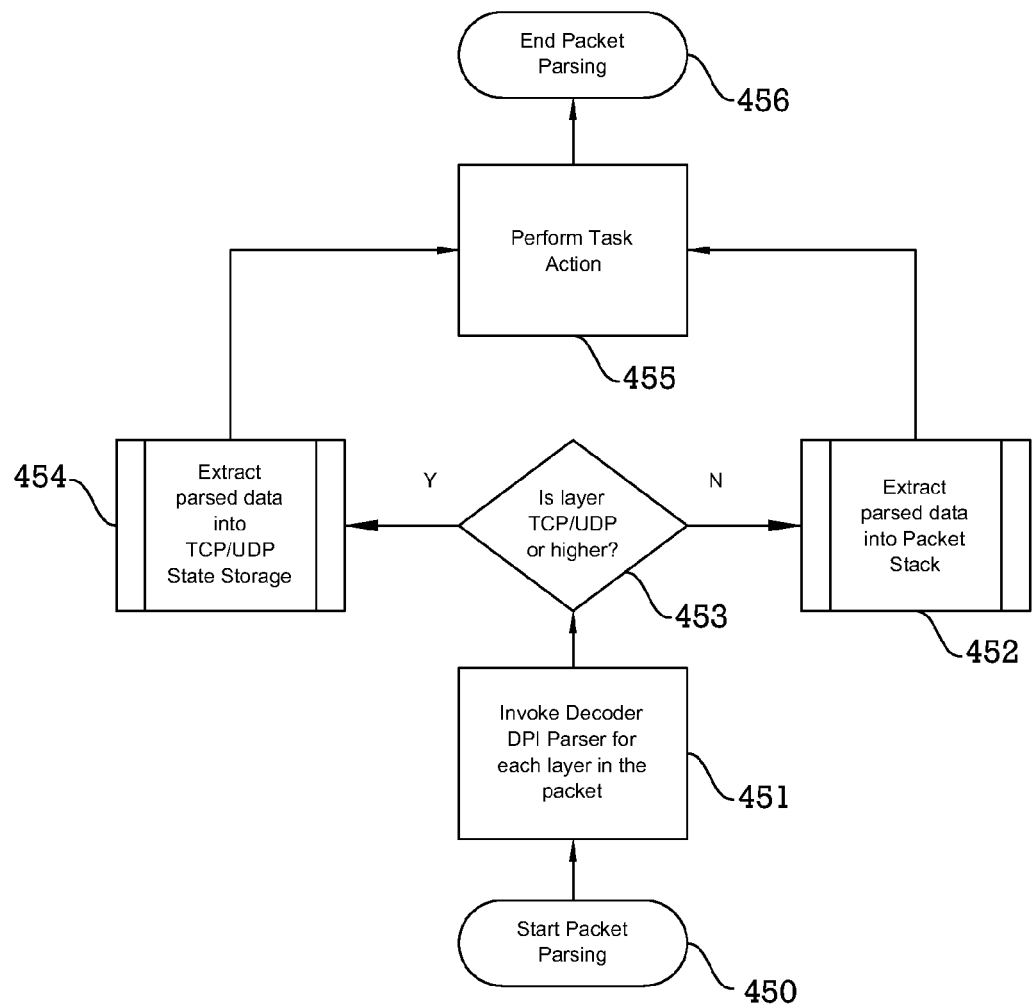
FIG. 4B is a flowchart depicting a method of parsing string-oriented or variable-length binary protocols, utilizing either a packet stack or TCP or UDP state storage, in accordance with one embodiment of the present invention.

Turning now to FIG. 4B, a flowchart 14 illustrates the detailed process of parsing the protocol data of a packet. Execution of the process begins at step 450 by calling the parse method. For each layer represented in the Packet Stack, step 451 invokes the parse sub-function associated with the protocol decoder for that layer. Step 453 determines if the layer being processed is the TCP layer, UDP layer or higher. If it is a higher-level protocol then step 454 causes the parsed data to be extracted into a state storage buffer. The state storage buffer is associated with the TCP/UDP connection table. If the packet is below the TCP/UDP layer then step 452 causes the data to be extracted and placed into the Packet Stack already associated with the packet.

Once all layers have been parsed, step 455 performs all actions that have been specified by the user. One possible action is to create an entity set row from the selected decomposed or parsed data and write the entity set row into the accumulator. Another possible action is to write the packet to the packet recorder. The current invention is not limited to these two types of actions, as any number of action types may be defined. The parsing process ends by exiting the process at step 456.

TCP and UDP State Storage

Upper-layer protocols such as FTP, SMTP, HTTP and others may be segmented across multiple TCP or UDP packets. In the worse case a message may be transmitted as one character per packet.

Figure 5:
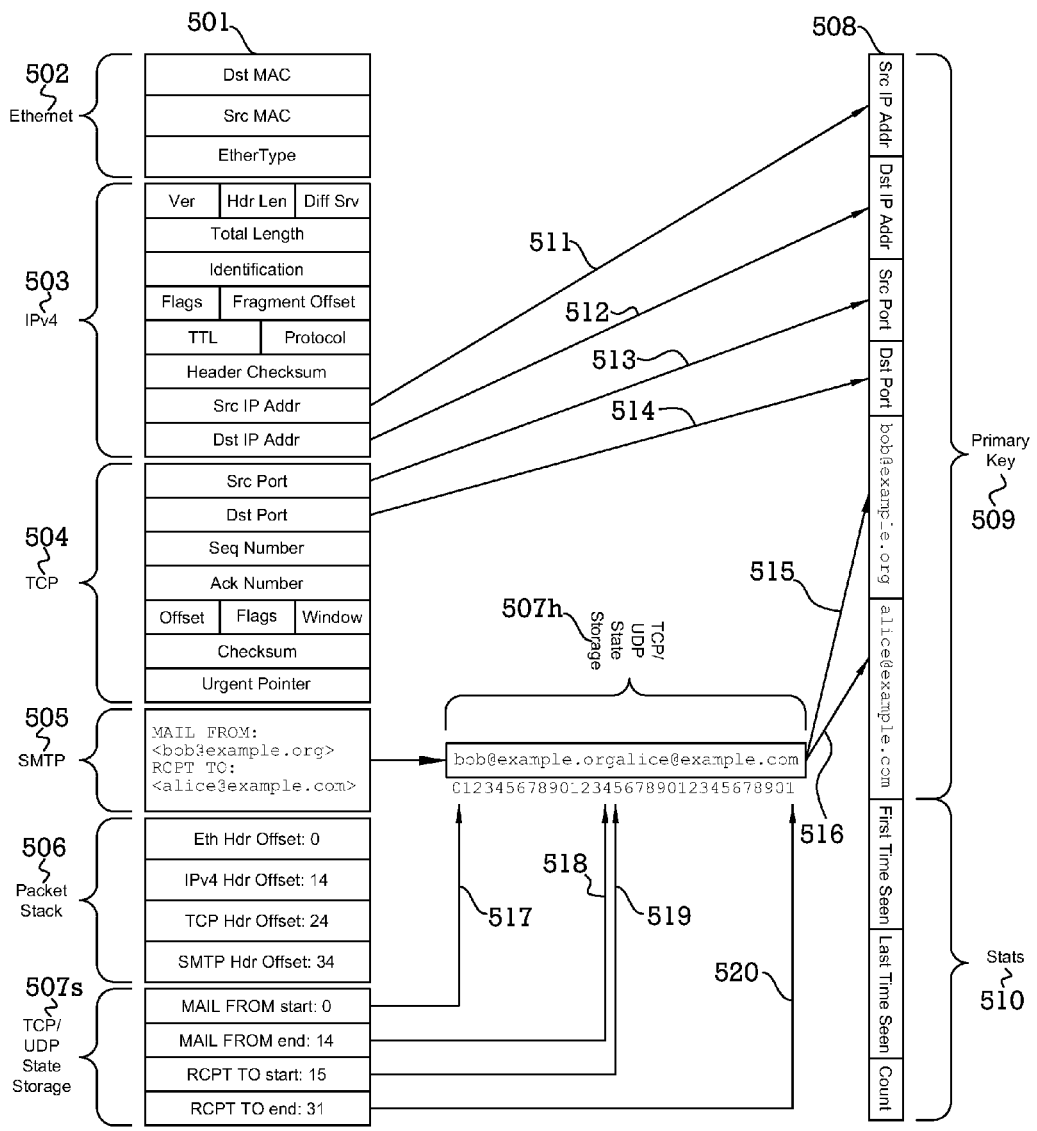
FIG. 5 is a diagram illustrating the data flow from network layers in the packet to an entity set (accumulator row), utilizing a packet stack and TCP state storage for intermediate storage, in accordance with one embodiment of the present invention.

The preferred embodiment of the current invention solves this problem by associating state storage with each TCP or UDP connection. The state storage retains parsing state information between packets in a given TCP or UDP stream. It comprises two components. The first component is a stack, as shown in FIG. 5, item 507*s*. The second component is a heap, as shown in FIG. 5, item 507*h*. Together these two data structures are used by the deep packet analysis packet parsing process to buffer incoming data and retain parsing state between packets.

FIG. 5 illustrates an SMTP message that has been parsed. The desired data has been extracted from the SMTP layer 505 into the TCP/UDP state storage heap 507*h* by the SMTP decoder parser function. The SMTP data could have come from a single packet, or from multiple packets. The extracted strings are packed into the heap with no separation characters. The first and last character offset of each string, shown by items 517, 518, 519, and 520, are saved by pushing them onto the TCP/UDP state storage stack 507*s*.

Collecting Data into Entity Sets

The packet parser function gathers the decomposed and parsed data and constructs an entity set according to the user's definition.

FIG. 5 illustrates the construction of an entity set 508. The Src IP Addr 511 and Dst IP Addr 512 data element entities are copied from the IPv4 503 layer of the packet. The Src Port 513 and Dst Port 514 data element entities are copied from the TCP 504 layer of the packet. The MailFrom 515 and RcptTo data element entities are copied from the TCP/UDP state storage heap 507*h* using the first and last character offsets from the TCP/UDP state storage stack 507*s*. These data element entities comprise the Primary key 509. The Stats 510 comprises meta-data that is inserted into the entity set after it is written into the accumulator.

Accumulator Operation

Figure 6:
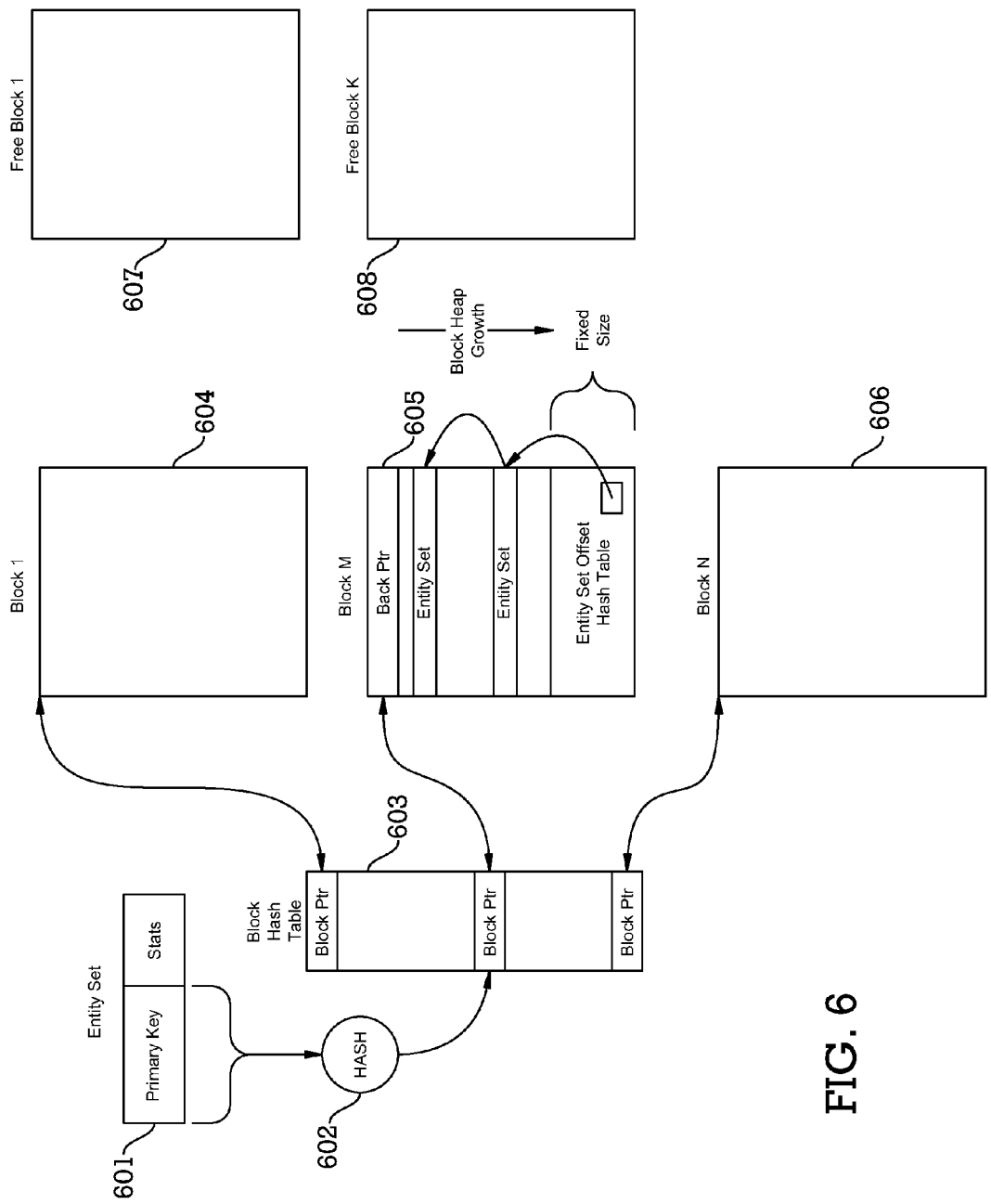
FIG. 6 is a simplified diagram illustrating the operation of the entity set accumulator, in accordance with one embodiment of the present invention.

FIG. 6 is a simplified diagram illustrating the components and operation of the entity set accumulator, in accordance with one embodiment of the present invention, and is described as follows.

The accumulator preferably comprises a plurality of memory buffers called blocks (604, 605, 606, 607, 608). All blocks are preferably the same size. In the preferred embodiment of the present invention the block size is 16 megabytes, although it will be understood that the blocks can be of any useful size.

Each block is preferably divided into three regions. The first region is a header containing a pointer to the slot assigned to the block in the block hash table 603. The second region is a heap where the entity sets are stored. The third region is a fixed-sized array of integers representing offsets, each of which points to the head of a bucket list.

The accumulator also includes a block hash table 603 which preferably comprises an array of pointers. Each pointer in the array points to a single block 604, 605, 606. The free blocks 607 and 608 are maintained by a separate linked list not shown in FIG. 6.

The accumulator supports two basic functions. The first function is insertion of a new entity set row into the accumulator. The second function is updating an existing entity set row in the accumulator. Both functions invoke a sub-function that attempts to find an entity set row in the accumulator using its primary key, as shown in FIG. 5 item 509 and FIG. 6 item 601.

Figure 7:
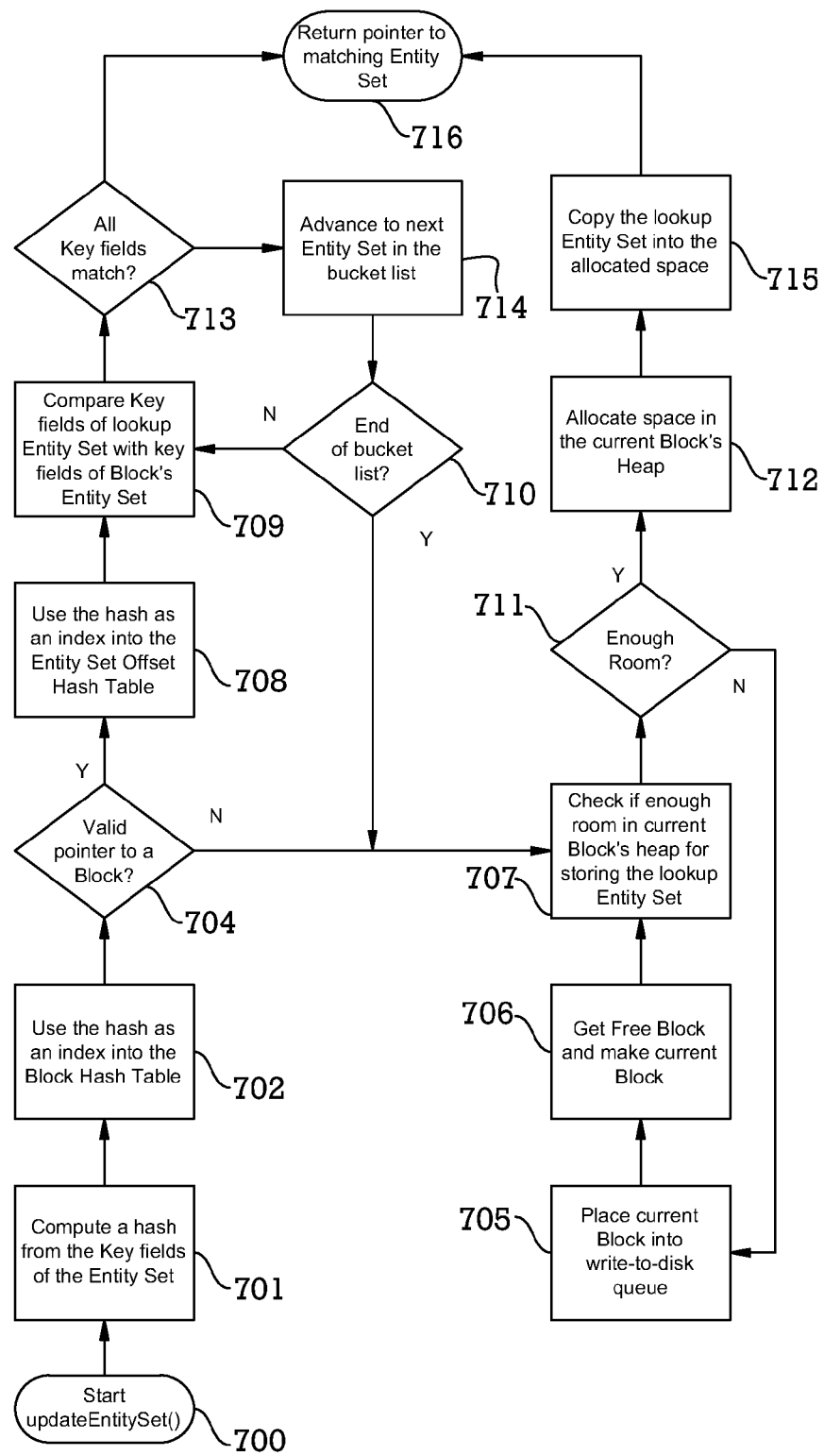
FIG. 7 is a flowchart of a method of updating or inserting a row into the entity set accumulator in FIG. 6, in accordance with one embodiment of the present invention.

With reference to FIGS. 6 and 7, the find sub-function generates a hash value 602 from the primary key of the entity set 601. Refer to FIG. 7, item 701. The hash value is used as an index into the block hash table 603 to retrieve a pointer to a block. Refer to FIG. 7, item 702. The hash value is again used as an index into the entity set offset hash table 605 to retrieve an offset to the head of a bucket list in the block. Refer to FIG. 7, item 708. If the offset is zero then the function returns an indication that the entity set does not exist in the accumulator. Otherwise the function uses the offset to compute a pointer to the head of a bucket list. The bucket list points to one or more entity sets with primary keys that generate the same hash value. The primary keys of each entity set in the bucket list are compared to the primary keys of the given entity set. Refer to FIG. 7, item 709. If all values in the primary keys match then the find sub-function returns a pointer to the matching entity set and a pointer to the block that contains the matching entity set. Refer to FIG. 7, items 713 and 716. If no matching entity set is found after comparing all entity sets in the bucket list then the find sub-function returns an indication that the entity set does not exist in the accumulator. Refer to FIG. 7, items 714 and 710.

The insertion function invokes the find sub-function, passing in the entity set to be found. If the entity set is found to exist in the accumulator then the insertion function returns. Otherwise the insertion function uses the hash value generated by the primary keys of the entity set to locate the block pointer in the block hash table 603. The entity set is then copied into the heap of the matching block and the entity set is linked into the matching bucket list. Refer to FIG. 7, items 707, 711, 705, 706, 712 and 715. The function returns a pointer to the new location of the entity set.

The update function invokes the find sub-function, passing in the entity set to be found. If the entity set is not found in the accumulator then the update function returns. Otherwise a valid pointer to an entity set is returned from the find sub-function. The update function uses the returned pointer to update the statistics values in the entity set row.

After some time the accumulator will fill up with rows of data and will no longer accept new entity set data. More specifically, a given block in the accumulator will fill up. The rate at which the accumulator fills is related to the size of the entity sets defined by the user and the rate at which new entity sets are created. Full blocks cannot accept new entity sets, therefore the entity sets would be discarded. This is undesirable behavior for a data mining system.

One embodiment of the present invention solves this problem by periodically writing full blocks to disk or other memory device, creating a new file each time a block is flushed. This process is referred to as flushing the accumulator, as the data is flushed from short-term memory into long-term memory. The preferred embodiment of the present invention relies on two factors to activate the flush process. The first factor is the age of data in a given block. A time limit T is assigned such that new entity sets will be flushed to disk in T time. More specifically, a block is flushed to disk that contains one or more entity sets that meets or exceeds the age limit T.

The second factor is the amount of free heap space remaining in a given block. A percentage full limit L is assigned such that a block is flushed to disk if it meets or exceeds L.

The preferred embodiment of the current invention utilizes Direct Memory Access (DMA) hardware during the accumulator flush operation to reduce the number of CPU cycles consumed.

After the block has been flushed to disk it is added to the pool of free blocks. Refer to FIG. 6, item 607 and 608.

Relational Database Insertion

A process referred to as the database inserter reads the blocks flushed to disk and inserts the entity set data into the appropriate table in the relational database 103 (FIG. 1).

The process begins by searching through a directory of flushed blocks searching for the oldest file. It is essential that the blocks are imported in sequential order, oldest to newest. An entity set may appear in more than one file. Some of the statistical data elements, such as time last seen, are sensitive to reordering. Ordered processing of the flushed block files maintains the integrity of such data elements.

The selected file is opened and the entity sets are read and decoded, row by row (entity set by entity set). Preferably, different types of entity sets are intermixed in the accumulator. The database inserter determines the type of entity set by inspecting a header pre-pended to each entity set.

Prior to running the high speed data extractor, the user has defined the various types of entity sets desired and has assigned a name to each entity set type. A table is created for each named entity set type during the initialization phase of the high speed data extractor. Each table is created with a number of columns equal to the sum of the number of data element entities and data element statistics. In addition, each column is created with a data type that is compatible with the associated data element it represents. Finally, a primary key is defined for the table which comprises the non-statistical data element entities (columns) of the entity set.

Upon reading an entity set row from the selected file, the database inserter creates an SQL statement that inserts the row into the appropriately named table. If the row does not exist in the table then it is inserted without change. If a row exists with the same primary key as the entity set to be inserted, then the database inserter will create an SQL statement that updates only the statistics columns from the data supplied by the entity set's statistics data elements.

The database inserter closes and deletes the selected file after all rows have been inserted into the relational database.

The present invention improves upon the prior art of high speed network data extraction in at least three important ways.

A first improvement comprises a method of dividing the work of decomposing and parsing packet data into multiple threads that are executed in parallel on multiple CPUs or CPU cores. The interaction between the packet decomposing and packet parsing is minimized in order to reduce or eliminate the number of semaphore or mutex checkpoints that control access to shared data structures. One embodiment of the present invention relies on pipelined operation to divide the work between threads. This greatly improves the throughput of data extraction in comparison to prior art.

A second improvement comprises the organization of extracted data into rows called entity sets. An entity set is defined by the user, who selects and arranges data elements, called entities, from a plurality of pre-defined entities supplied by the various protocol decoders loaded into the system. Entities comprise data elements extracted from a network packet or statistical data generated by the program. An entity set is stored as a row in an accumulator and later as a row in a table in a relational database. The user of the system can easily add new entity set definitions according to his or her data processing and analysis needs. No existing prior art provides this feature.

A third improvement comprises a memory-based accumulator to temporarily store rows of extracted data before inserting them into a relational database table. The in-memory accumulator greatly reduces the CPU and I/O cycles required to update a row's statistical information. Rows in the accumulator are periodically flushed to disk files, making room for new rows in the accumulator. Entity set rows that have been flushed to a disk file are read by another process that inserts the rows into a relational database table. The full power of SQL queries can correlate data contained in the tables and generate reports for the user. This is a feature not provided by the prior art.

The three improvements listed above, when combined, allow the present invention to extract data from network packet streams in excess of 20 gigabits per second, a sharp improvement over the prior art.

It will be understood that the terms "disk" and "hard disk" as used throughout the specification are set forth as exemplary devices for storing the data. Suitable devices may include an entire disk drive, or only part of a disk drive, such as a single partition. One embodiment of the current invention utilizes Hard Disk Drives (HDD). Another embodiment of the current invention utilizes Solid State Drives (SSD). Yet another embodiment of the current invention utilizes Network Attached Storage (NAS). Accordingly, the current invention may utilize practically any type of random-access, block-oriented storage.

It will be understood that the term "preferably" and its derivatives as used throughout the specification refers to one or more exemplary embodiments of the invention and therefore is not to be interpreted in any limiting sense.

It will be appreciated by those skilled in the art that changes could be made to the embodiments described above without departing from the broad inventive concept thereof. It will be understood, therefore, that this invention is not limited to the particular embodiments disclosed, but also covers modifications within the spirit and scope of the present invention as defined by the appended claims.

What is claimed is:

1. A system for network data extraction comprising:
a packet decoding engine including at least one protocol decoder operable to decompose and parse received packets and identify extractable data entities from the received packets;
a data extraction engine operable to extract identified data entities from the packets and arrange the data entities into entity sets along with statistical elements reflective of redundant entity sets; and
an accumulator for storage of extracted entity sets and elimination of redundant entity sets.

2. The system of claim 1, and further comprising a filter processing engine operable to select only packets which contain entities for extraction.

3. The system of claim 2, further operable to copy entity sets from the accumulator to long-term storage.

4. The system of claim 3, further comprising a database insertion engine to copy entity sets from long-term storage into a relational database.

5. The system of claim 4, further operable to allow a user to add an entity set definition, remove an entity set definition, and modify an entity set definition.

6. The system of claim 5, further operable to allow addition of protocol decoders to extend the set of entities available for inclusion in entity sets.

7. The system of claim 6, further comprising a reassembly and state storage engine for reassembling packets having IP, TCP and UDP segments of like streams and allocating state storage for said reassembled streams.

8. The system of claim 7, further comprising a packet recorder engine for recording each packet to long-term storage.

9. A method for network data extraction comprising:
receiving packets of data, each packet having at least one protocol layer and at least one payload section;
decomposing the received packets to delineate a location of the at least one protocol layer within each packet;
parsing the received packets to access data entities in the at least one payload section within the packet;
extracting data entities from the at least one protocol layer and payload section within the packet;
constructing entity sets from the extracted data entities;
inserting at least some of the entity sets into an accumulator; and
inserting at least some of the entity sets from the accumulator into a relational database.

10. The method of claim 9, wherein the step of inserting at least some of the entity sets into the accumulator comprises temporarily storing rows of extracted data entities in the accumulator before inserting them into the relational database.

11. The method of claim 10, and further comprising converting redundant entity sets into statistical data for temporary storage in the accumulator to thereby eliminate storing redundant entity sets.

12. The method of claim 11, and further comprising copying entity sets from the accumulator to long-term storage prior to inserting them into the relational database.

13. The method of claim 9, and further comprising comparing at least one filter to each received packet in order to further qualify the packets for entity extraction.

14. The method of claim 9, and further comprising allowing a user to add an entity set definition, remove an entity set definition, and modify an entity set definition.

15. The method of claim 14, and further comprising allowing the addition of protocol decoders to expand the amount of data entities available for inclusion in entity sets.

16. The method of claim 9, wherein the packets include IP, TCP and UDP segments, and further comprising reassembling the IP, TCP and UDP segments of like streams and allocating state storage for said reassembled streams subsequent to parsing the received packets.

17. The method of claim 16, and further comprising recording each packet to long-term storage.

18. The method of claim 9, wherein a plurality of the received packets are processed in parallel on multiple processors or processor cores.

19. The method of claim 18, wherein the steps of decomposing and parsing the received packets are executable within the plurality of protocol decoders in parallel on further multiple processors or processor cores.

20. A system for network data extraction comprising:
at least one processor operable to execute computer program instructions;
at least one memory operable to store computer program instructions executable by the processor; and
computer program instructions stored in the at least one memory and executable to perform the steps of:
receiving packets of data, each packet having at least one protocol layer and at least one payload section;
decomposing the received packets to delineate a location of the at least one protocol layer within each packet;
parsing the received packets to access data entities in the at least one payload section within the packet;
extracting data entities from the at least one protocol layer and payload section within the packet;
constructing entity sets from the extracted data entities;
inserting at least some of the entity sets into an accumulator; and
inserting at least some of the entity sets from the accumulator into a relational database.

21. The system of claim 20, wherein the step of inserting at least some of the entity sets into the accumulator comprises temporarily storing rows of extracted data entities in the accumulator before inserting them into the relational database.

22. The system of claim 21, and further comprising converting redundant entity sets into statistical data for temporary storage in the accumulator to thereby eliminate storing redundant entity sets.

23. The system of claim 22, and further comprising copying entity sets from the accumulator to long-term storage prior to inserting them into the relational database.

24. The system of claim 20, and further comprising comparing at least one filter to each received packet in order to further qualify the packets for entity extraction.

25. The system of claim 20, and further comprising allowing a user to add an entity set definition, remove an entity set definition, and modify an entity set definition.

26. The system of claim 25, and further comprising allowing the addition of protocol decoders to expand the amount of data entities available for inclusion in entity sets.

27. The system of claim 20, wherein the packets include IP, TCP and UDP segments, and further comprising reassembling the IP, TCP and UDP segments of like streams and allocating state storage for said reassembled streams subsequent to parsing the received packets.

28. The system of claim 27, and further comprising recording each packet to long-term storage.

29. The system of claim 20, wherein the at least one processor comprises a plurality of processors or processor cores, each processor or processor core being operably associated with a protocol decoder for executing the decomposing and parsing steps to thereby allow the execution of the plurality of protocol decoders in parallel on a plurality of received packets.

30. The method of claim 29, wherein the steps of decomposing and parsing the received packets are executable within the plurality of protocol decoders in parallel on further multiple processors or processor cores.

31. A computer program product of network data extraction comprising:

a computer readable medium; and computer program instructions, recorded on the computer readable medium, executable by a processor, for performing the steps of:

receiving packets of data, each packet having at least one protocol layer and at least one payload section;

decomposing the received packets to delineate a location of the at least one protocol layer within each packet;

parsing the received packets to access data entities in the at least one payload section within the packet;

extracting data entities from the at least one protocol layer and payload section within the packet;

constructing entity sets from the extracted data entities;

inserting at least some of the entity sets into an accumulator; and inserting at least some of the entity sets from the accumulator into a relational database.

32. The system of claim 31, wherein the step of inserting at least some of the entity sets into the accumulator comprises temporarily storing rows of extracted data entities in the accumulator before inserting them into the relational database.

33. The system of claim 32, and further comprising converting redundant entity sets into statistical data for temporary storage in the accumulator to thereby eliminate storing redundant entity sets.

34. The system of claim 33, and further comprising copying entity sets from the accumulator to long-term storage prior to inserting them into the relational database.

35. The system of claim 31, and further comprising comparing at least one filter to each received packet in order to further qualify the packets for entity extraction.

36. The system of claim 31, and further comprising allowing a user to add an entity set definition, remove an entity set definition, and modify an entity set definition.

37. The system of claim 31, and further comprising allowing the addition of protocol decoders to expand the amount of data entities available for inclusion in entity sets.

38. The system of claim 31, wherein the packets include IP, TCP and UDP segments, and further comprising reassembling the IP, TCP and UDP segments of like streams and allocating state storage for said reassembled streams subsequent to parsing the received packets.

39. The system of claim 38, and further comprising recording each packet to long-term storage.

40. The system of claim 31, wherein the at least one processor comprises a plurality of processors or processor cores, each processor or processor core being operably associated with a protocol decoder for executing the decomposing and parsing steps to thereby allow the execution of the plurality of protocol decoders in parallel on a plurality of received packets.

41. The method of claim 40, wherein the steps of decomposing and parsing the received packets are executable within the plurality of protocol decoders in parallel on further multiple processors or processor cores.

* * * * *